US009869222B2

(12) United States Patent
Suib et al.

(10) Patent No.: US 9,869,222 B2
(45) Date of Patent: Jan. 16, 2018

(54) METHOD FOR REMOVING SOOT FROM EXHAUST GASES

(71) Applicant: UNIVERSITY OF CONNECTICUT, Farmington, CT (US)

(72) Inventors: Steven L. Suib, Storrs, CT (US); D. A. Saminda Dharmarathna, Vernon, CT (US); Lakshitha R. Pahalagedara, Willimantic, CT (US)

(73) Assignee: University of Connecticut, Farmington, CT (US)

( * ) Notice: Subject to any disclaimer, the term of this patent is extended or adjusted under 35 U.S.C. 154(b) by 1 day.

(21) Appl. No.: 14/971,404

(22) Filed: Dec. 16, 2015

(65) Prior Publication Data

US 2016/0177794 A1 Jun. 23, 2016

Related U.S. Application Data

(60) Provisional application No. 62/093,180, filed on Dec. 17, 2014.

(51) Int. Cl.

| | |
|---|---|
| *B01D 46/00* | (2006.01) |
| *B01D 53/94* | (2006.01) |
| *F01N 3/035* | (2006.01) |
| *F01N 3/20* | (2006.01) |
| *F01N 3/28* | (2006.01) |
| *F01N 3/023* | (2006.01) |
| *B01J 23/889* | (2006.01) |
| *B01J 23/34* | (2006.01) |
| *B01J 23/00* | (2006.01) |
| *B01J 37/10* | (2006.01) |
| *B01J 29/035* | (2006.01) |

(52) U.S. Cl.
CPC ............ *F01N 3/035* (2013.01); *B01D 53/94* (2013.01); *B01D 53/944* (2013.01); *B01J 23/002* (2013.01); *B01J 23/34* (2013.01); *B01J 23/8892* (2013.01); *B01J 29/0358* (2013.01); *B01J 37/10* (2013.01); *F01N 3/023* (2013.01); *B01D 2255/2073* (2013.01); *B01D 2255/20746* (2013.01); *B01D 2255/50* (2013.01); *B01D 2258/012* (2013.01); *B01J 2523/00* (2013.01)

(58) Field of Classification Search
CPC ............... B01D 46/00; B01D 46/0001; B01D 46/0061; B01D 46/2418; B01D 37/025; B01D 2239/0478; B01D 2255/2073; B01D 2255/65; B01D 2255/915; B01D 2255/9155; B01D 2258/012; B01D 2279/30; B01D 53/94; F01N 3/021; F01N 3/035; F01N 3/20; F01N 3/28; F01N 2250/02

See application file for complete search history.

(56) References Cited

U.S. PATENT DOCUMENTS

| | | | | |
|---|---|---|---|---|
| 7,631,488 | B2 | 12/2009 | Chung et al. | |
| 7,771,669 | B2 | 8/2010 | Chigapov et al. | |
| 2005/0169826 | A1* | 8/2005 | Li | B01D 53/9431 423/244.06 |
| 2006/0177367 | A1* | 8/2006 | Li | B01D 53/949 423/239.1 |
| 2014/0255805 | A1* | 9/2014 | Wang | H01M 8/0675 429/410 |
| 2016/0346770 | A1* | 12/2016 | Kilmartin | B01D 53/8628 |
| 2017/0014803 | A1* | 1/2017 | Sidheswaran | B01J 23/34 |

FOREIGN PATENT DOCUMENTS

WO  WO 2005077498 A1 * 8/2005 ........... B01D 53/949

OTHER PUBLICATIONS

Liang, et al., "Oxygen activation on Cu/Mn—Ce mixed oxides and the role in diesel soot oxidation", Catal. Today. 2008, 139, 113-118.
Tikhomirov, et al., "MnOx—CeO2 mixed oxides for the low-temperature oxidation of diesel soot", Appl. Catal. B-Environ., 2006, 64, 72-78.

* cited by examiner

*Primary Examiner* — Timothy Vanoy
(74) *Attorney, Agent, or Firm* — Bryan D. Zerhusen; Locke Lord LLP

(57) ABSTRACT

A method for oxidizing soot from diesel exhaust gas from a diesel engine. The method involves providing a diesel particulate filter for receiving the diesel exhaust gas; coating a catalyst composition on the diesel particulate filter; and contacting the soot from the diesel exhaust gas with the catalyst coated diesel particulate filter at a temperature sufficient to oxidize the soot to carbon dioxide. The catalyst composition is a doped or undoped manganese oxide octahedral molecular sieve (OMS-2) material. A diesel exhaust gas treatment system that includes a diesel particulate filter for receiving diesel exhaust gas from a diesel engine and collecting soot; and a catalyst composition coated on the diesel particulate filter. The catalyst composition is a doped or undoped manganese oxide octahedral molecular sieve (OMS-2).

26 Claims, 5 Drawing Sheets

Fig. 2

| | T10 | T50 | T90 | T100 |
|---|---|---|---|---|
| NON | 382 | 475 | 532 | 626 |
| Co-OMS-2 | 238 | 270 | 328 | 349 |
| HY-OMS-2 | 284 | 368 | 394 | 430 |
| COM | 332 | 393 | 460 | NA |

NA = Not achieved

METHOD FOR REMOVING SOOT FROM EXHAUST GASES

RELATED APPLICATION

This application claims the benefit of U.S. Provisional Application Ser. No. 62/093,180, filed on Dec. 17, 2014, which is incorporated herein by reference in its entirety.

GOVERNMENT LICENSE RIGHTS

This invention was made with government support under contract 5226640 awarded by U.S. Department of Energy. The government has certain rights in the invention.

BACKGROUND

1. Field of the Disclosure

This disclosure relates to a method for removing soot from exhaust gases. In particular, this disclosure relates to a method for oxidizing soot from diesel exhaust gas from a diesel engine, a diesel exhaust gas treatment system, a method of providing a catalyst composition on a diesel particulate filter, and a catalyst composition for facilitating soot oxidation. The catalyst composition is a doped or undoped manganese oxide octahedral molecular sieve (OMS-2) material (e.g., cobalt doped manganese oxide octahedral molecular sieve (OMS-2) material).

2. Discussion of the Background Art

In general, diesel engines are advantageous because they have various uses due to their high power and ability to be operated even under high loads. However, since exhaust gases discharged from such diesel engines are a major source of air pollution, their allowable discharge standard becomes more and more strict throughout the world. The main pollutants from diesel engines include fine soot particulates, hydrocarbons, carbon monoxide, soluble organic solvents, and nitrogen oxides. In particular, the soot particulates directly impact life, such as increasing a generation rate of cancer of the respiratory organs.

In recent years, environmental regulations in the United States and Europe restricting diesel particulate emissions have necessitated improvements in the removal of particulates from diesel engine emissions. Such particulates generally consist of carbonaceous particulates in the form of soot.

At present, there are two major diesel particular filter (DPF) regeneration techniques; active regeneration and passive regeneration. In active DPF regeneration the particulate matter is periodically oxidized either using a heater/a flame based burner at elevated temperatures (above 600° C.) or by increasing the exhaust gas temperature. This flame based technique possesses serious fire hazard and also due to the elevated temperature, the filter matrix could breakdown and cause damage to the internal engine parts. Another drawback of this method is the poor regeneration efficiency, resulting in deposition of up to 35% of soot on the filter. This method also consumes a large amount of energy during the heating process thereby decreasing the fuel efficiency of the engine.

In passive regeneration, the particulate matter is oxidized by means of an on-going catalytic oxidation process. The method is both economically and environmentally preferred since it requires no additional energy source, occurs at exhaust gas temperature, very simple, effective, and fuel efficient. However, finding a catalyst which is capable of decreasing the soot combustion temperature from 600° C. to diesel engine exhaust temperature (typically 150-400° C.) and also carryout complete oxidation of soot to $CO_2$ without toxic CO gas is challenging.

In most cases, the filter is coated with precious metals including platinum group metals (PGM) such as Pt and Pd. However, these metals are very expensive and they also highly active in undesirable reactions such as oxidation of $SO_2$ to $SO_3$. In addition to PGM, Ag with an active metal (Cu, La, Co, Ni, Mn, Fe, Ce) oxide component has also been used in DPF coatings. However, these materials are capable of oxidizing soot at temperatures between 500-600° C., which are much higher than the diesel engine exhaust temperatures. Therefore, additional energy is required to drive the oxidation.

Furthermore, currently most of the catalysts generate a considerable amount of CO during the combustion of diesel soot which, is a byproduct from incomplete oxidation and possesses serious health hazard. In addition, most of the currently used catalysts require a high catalyst to soot ratio which reduces its efficiency in the real applications. Thus, it is desirable to develop a diesel soot oxidation catalyst which is highly active at diesel engine exhaust temperatures, highly selective towards $CO_2$, much greener, highly efficient, and less expensive.

The present disclosure provides many advantages over the prior art, which shall become apparent as described below.

SUMMARY OF THE DISCLOSURE

This disclosure relates in part to a method for oxidizing soot from diesel exhaust gas from a diesel engine. The method comprises: providing a diesel particulate filter for receiving the diesel exhaust gas; coating a catalyst composition on the diesel particulate filter; wherein the catalyst composition comprises a doped or undoped manganese oxide octahedral molecular sieve (OMS-2); and contacting the soot from the diesel exhaust gas with the catalyst coated diesel particulate filter at a temperature sufficient to oxidize the soot to carbon dioxide.

This disclosure also relates in part to a diesel exhaust gas treatment system. The diesel exhaust gas treatment system comprises: a diesel particulate filter for receiving diesel exhaust gas from a diesel engine and collecting soot; and a catalyst composition coated on the diesel particulate filter; wherein the catalyst composition comprises a doped or undoped manganese oxide octahedral molecular sieve (OMS-2).

This disclosure further relates in part to a method of providing a catalyst composition on a diesel particulate filter. The method comprises: providing a diesel particulate filter; and applying a catalyst composition for facilitating soot oxidation on the diesel particulate filter; wherein the catalyst comprises a doped or undoped manganese oxide octahedral molecular sieve (OMS-2).

This disclosure yet further relates in part a catalyst composition for facilitating soot oxidation. The catalyst comprises a doped or undoped manganese oxide octahedral molecular sieve (OMS-2).

Further objects, features and advantages of the present disclosure will be understood by reference to the following drawings and detailed description.

BRIEF DESCRIPTION OF THE DRAWINGS

FIG. 2 shows the oxidation temperature of soot with noncatalytic (NON), Co-doped cryptomelane (Co-OMS-2), hydrothermaly synthesized undoped cryptomelane (HY-OMS-2), and commercially available manganese oxide (COM) in accordance with Example 4.

DETAILED DESCRIPTION OF THE PREFERRED EMBODIMENT

Figure 1:
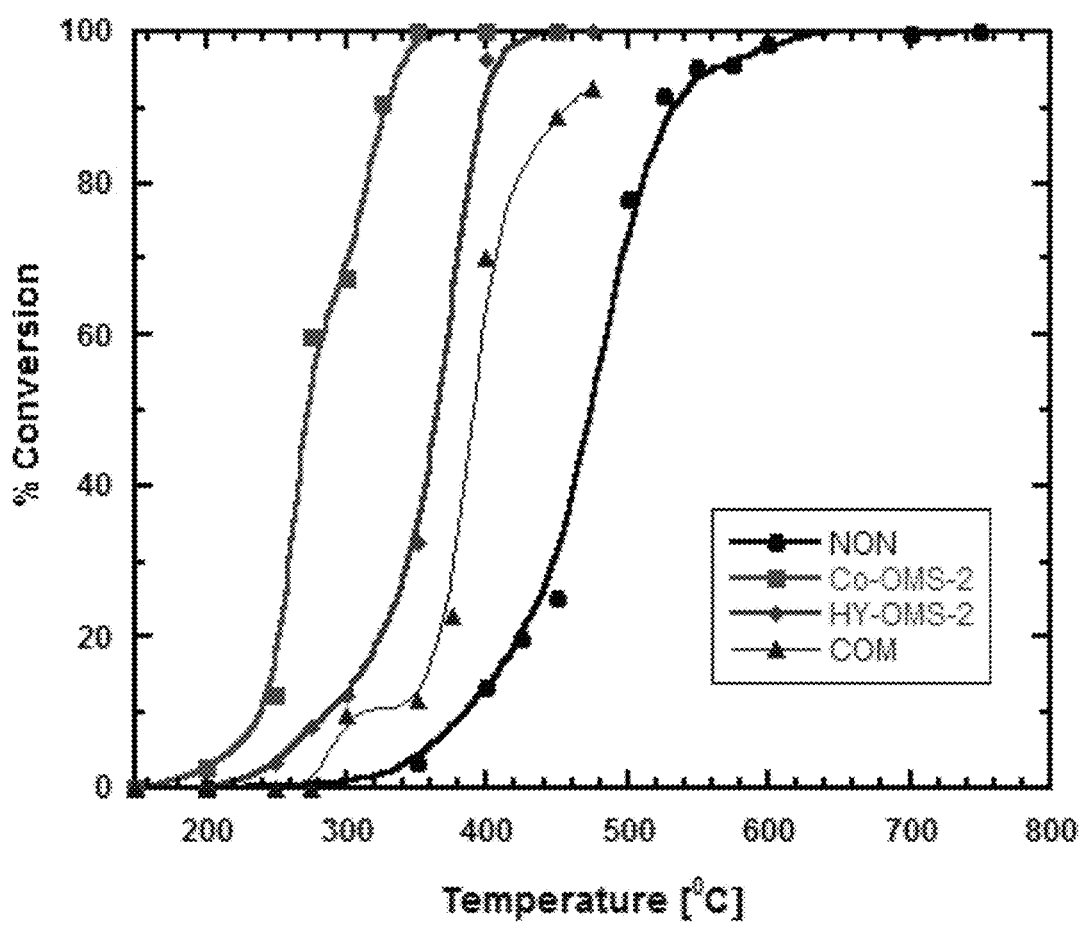
FIG. 1 graphically shows the effect of temperature on the soot oxidation activity for noncatalytic (NON), Co-doped cryptomelane (Co-OMS-2), hydrothermaly synthesized undoped cryptomelane (HY-OMS-2), and commercially available manganese oxide (COM) in accordance with Example 4.

All numerical values within the detailed description and the claims herein are modified by "about" or "approximately" the indicated value, and take into account experimental error and variations that would be expected by a person having ordinary skill in the art.

This disclosure relates to a catalyst for selective oxidation of diesel particulate matter (soot) to carbon dioxide, which is to be used in the catalytic coating for DPFs. The catalyst is 100% selective to carbon dioxide and no carbon monoxide is obtained as an oxidation product. In addition, the catalyst prepared according to the present disclosure assists the oxidation reaction to achieve 100% conversion at a lower temperature (~350° C.) using a lower catalyst to soot weight ratio (2:1) as compared to previously reported catalysts. The catalyst preparation and the product thereof are essentially free of rare earth metals, precious metals, highly toxic metals, highly acidic/basic conditions.

The catalyst of this disclosure can be used in the after treatment process (carbon combustion) of the diesel engine exhaust system by the automotive industry. The catalyst can be used as a coating in DPFs to oxidize the undesirable soot deposits and regenerate the filter.

The present disclosure does not require high temperatures and pressures and operates under diesel engine exhaust temperatures. Thus, the use of an external heater is not required. Therefore, the periodic regeneration of the DPF or an extra attention is not needed. This increases the efficiency of the diesel engine and reduces the wear of the diesel particulate filter. Also, no additional fuel is needed for regeneration process. This greatly reduces the cost for the regeneration process. Furthermore, since the staring materials of the new catalyst are cheap, the cost for the catalyst coated DPF could be reduced to a great extent.

The catalyst of this disclosure is highly active at diesel engine exhaust temperatures, environmentally benign, and does not include noble metals, hence less expensive. The catalytic process is 100% selective towards $CO_2$. The reaction is truly catalytic. Moreover, the catalyst is stable at high temperatures. Also, the catalyst is highly active even at ambient pressure and is independent of the flow rate, hence, the catalytic process is predictable. Thus, the disclosure is potentially attractive for large scale industrial applications.

The OMS-2 catalyst material of this disclosure can burn off the soot particulates accumulated on a DPF at the temperature of diesel exhaust (low temperature ~350° C.). The oxidation produces 100% $CO_2$ rather than CO as the oxidation product. Cobalt doped cryptomelane (Co-OMS-2) further reduces the operating temperature. This disclosure has application on the exhaust system of diesel vehicles or other diesel burning equipment (generators).

DPFs capture particle emissions through a combination of filtration mechanisms, such as diffusional deposition, inertial deposition, or flow-line interception. Collected particulates are removed from the filter, continuously or periodically, through thermal regeneration. Diesel filters are highly effective in controlling solid particulate emissions—including solid particle numbers—but may be ineffective in controlling liquid fractions of PM emission. Filters were first commercialized as retrofit devices, followed by a wide scale adoption on new light-duty and heavy-duty diesel engines in both highway and non-road applications.

The catalyst of this disclosure does not require noble or rare earth metals and performs at low temperature. Therefore an external heater on the particulate filter is not required for the vehicle exhaust system.

The manganese oxide is preferably a manganese oxide octahedral molecular sieve (OMS) material. The cobalt doped manganese oxide octahedral molecular sieve (OMS) preferably has a Cryptomelane type structure.

The cobalt in the cobalt doped manganese oxide octahedral molecular sieve (OMS) material is present in an amount of from about 0.1 weight percent to about 25 weight percent The metal oxide catalyst material useful in the process of this disclosure catalyzes the oxidation of soot to carbon dioxide. The presence of the metal oxide material ensures that the product begins to work immediately after being placed in contact with diesel exhaust gas. The metal oxide can be a manganese oxide, manganese hydroxide, iron oxide, iron hydroxide, zinc oxide, zinc hydroxide, and combinations thereof. The use of manganese oxide octahedral molecular sieve (OMS) material is preferred. The use of a doped (e.g., cobalt) manganese oxide octahedral molecular sieve (OMS) material is more preferred.

The concentration of the manganese oxide octahedral molecular sieve (OMS) catalyst material used in the process of this disclosure can vary over a wide range and need only be at a concentration sufficient to form the oxidation catalyst composition. The manganese oxide octahedral molecular sieve (OMS) material can be present in a molar concentration ratio of from about 1 M to about 10 M, preferably from about 1 M to about 5 M, and more preferably from about 0.5 M to about 1 M (based on a total volume).

One or more metal dopant precursors are useful in the processes of this disclosure. Physicochemical properties of the manganese oxide octahedral molecular sieve (OMS) catalyst materials of this disclosure can be controlled by the use of metal dopant precursors in the synthesis thereof. The metal dopant precursors useful in this disclosure makes the tuning of physicochemical properties of the manganese oxide octahedral molecular sieve (OMS) catalyst materials possible by controlling, for example, surface area, pore size and pore volume.

Illustrative metal dopant precursors include, for example, metal halides, metal phosphates, metal acetates, metal nitrates, metal alkoxides, and $M_xO_y$ oxides that are capable of dissolving in $HNO_3$. More particularly, metal precursors include, for example, metal halides such as $M(NO_3)_x \cdot yH_2O$ (M=Mn, Fe, Co, Cu, Zn, Si), HfCl$_4$ or NbCl$_4$, tetraethyl orthosilicate (TEOS), tetramethyl orthosilicate (TMOS), titanium isopropoxide, zirconium n-propoxide, zirconium butoxide, Ce(NO$_3$)$_3$.6H$_2$O, Gd(NO$_3$)$_3$.6H$_2$O, Sm(NO$_3$)$_3$.6H$_2$O, and the like.

The metal dopant precursors useful in the process of this disclosure include precursors of transition metals, Lanthanide metals, post-transition metals, metalloids, and mixtures thereof. For example, the transition metal precursors comprise Group 3-12 transition metal precursors, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursors. In an embodiment, the transition metal precursors are selected from Group 6-12 transition metal precursors including Cr, Mo, W, Mn, Tc, Re, Fe, Ru, Os, Co, Rh, Ir, Ni, Pd, Pt, Cu, Ag, Au, Zn, Cd and Hg precursors. Preferably, the Group 6-12 transition metal precursors include Mn, Fe, Co, Ni, Cu and Zn precursors. The Lanthanide metal precursors include La, Ce, Pr, Nd, Pm, Sm, Eu, Gd, Tb, Dy, Ho, Er, Tm, Yb and Lu precursors, or any mixture thereof. The post-transition metal precursors include Al, Ga, In, Tl, Sn, Pb and Bi precursors, or any mixture thereof. The metalloid precursors include B, Si, Ge, As, Sb, Te, Po and At precursors, or any mixture thereof.

The concentration of the metal dopant precursors used in the process of this disclosure can vary over a wide range and need only be at a concentration sufficient to form the doped manganese oxide octahedral molecular sieve (OMS) materials. The metal precursors can be present in a molar concentration ratio of from about $1\times10^{-2}$ M to about 10 M, preferably from about $1\times10^{-1}$ M to about 5 M, and more preferably from about $5\times10^{-1}$ M to about 1 M (based on a total volume).

Preferred metal dopant precursors include M(NO$_3$)$_x$ (M=Co).

The catalyst composition to soot weight ratio is from about 1.5:1 to about 3:1, preferably about 2:1.

The process conditions for doping the manganese oxide octahedral molecular sieve (OMS) catalyst materials with the metal dopant precursor, such as temperature, pressure and contact time, may vary greatly and any suitable combination of such conditions may be employed herein. In a preferred embodiment, the process conditions are sufficient to tune the structural properties of the doped manganese oxide octahedral molecular sieve (OMS) catalyst materials. The doping temperature may be between about −80° C. to about 150° C., and most preferably between about 20° C. to about 80° C. Normally the doping is carried out under ambient pressure and the contact time may vary from a matter of seconds or minutes to a few hours or greater. The reactants can be added to the reaction mixture or combined in any order. The stir time employed can range from about 0.1 to about 400 hours, preferably from about 1 to 75 hours, and more preferably from about 4 to 16 hours.

The method of making the doped manganese oxide octahedral molecular sieve (OMS) catalyst materials involves mixing all the constituents in ambient temperature to achieve a homogenous mix. The amount of each constituent can be varied within the ranges disclosed above. Any of a variety of devices can be used to stir or mix the products, including paddle mixers, tumblers, and a variety of other stirrers or mixers.

In addition, the oxidation catalyst of the present disclosure may be used by directly applying it to an exhaust pipe for the discharge of exhaust gases, or by applying it to a wall of a device for filtering soot particulates or a honeycombed dust filter module for purifying exhaust gases. Thereby, the fine soot particulates adhere on the surface of the oxidation catalyst thus applied, and thus, they are oxidized by oxygen present in the exhaust gases and removed. This procedure may be explained as follows:

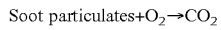

Soot particulates+O$_2$→CO$_2$

In addition, the present disclosure provides a method of removing fine soot particulates, which comprises contacting fine soot particulates of exhaust gases with the oxidation catalyst to oxidize the fine soot particulates using oxygen in exhaust gases at 150-550° C., preferably 150-450° C., and more preferably 150-350° C., thus removing fine soot particulates.

The oxidation catalyst of the present disclosure can be directly applied to an exhaust pipe for discharging exhaust gases, or is applied to a wall of a device for filtering soot particulates or a honeycombed module for purifying exhaust gases. Thereby, the oxidation catalyst contacts fine soot particulates of exhaust gases, and thus, the soot particulates are oxidized using oxygen at 150° C. or higher, thus removing fine soot particulates. Meanwhile, the fine particulates, precipitated due to the incomplete combustion at a temperature lower than 150° C., begin to burn in the presence of the catalyst of the present disclosure as the temperature of the diesel engine is increased to 150° C. or higher. Further, the soot particulates are combusted without catalysts at a temperature of higher than 650° C.

The oxidation catalyst of the present disclosure may be used to remove fine soot particulates from exhaust gases of diesel engines, incinerators, or boilers, at low temperatures. Further, since the above catalyst can exhibit thermal durability, its activity may be stably maintained even under thermal stress for a long time period. Also, the catalyst eliminates the danger of poisoning from sulfur compounds present in exhaust gases, and can stably maintain its activity.

The catalyst composition of the present disclosure provides comparable or better soot oxidation properties than commercial formulations having noble metal loadings. In addition, when coated onto a diesel particulate filter, the catalyst composition provides good thermal stability, minimal backpressure, and high surface area. By "thermal stability" it is meant that the catalyst maintains its activity or oxidation performance even after exposure to high temperatures. By "backpressure," it is meant the resistance to flow which is caused when the filter pores become blocked or are decreased in size, e.g., from the accumulation of soot or the coating of the catalyst onto the filter. By "minimal backpressure" it is meant that, when coated onto the filter, the catalyst coating of the present disclosure increases the backpressure of the filter only slightly.

The doped or undoped manganese oxide octahedral molecular sieve (OMS-2) catalyst of this disclosure can be regenerated at a temperature and for a period to time sufficient to substantially oxidize the soot to carbon dioxide. In an embodiment, the regenerating can be conducted at a temperature of about 350° C. or less. In another embodiment, the regenerating can be conducted at a temperature of the diesel exhaust gas.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All reactions in the following examples were performed using as-received starting materials without any purification.

Synthesis of Cryptomelane (K-OMS-2) and Co Doped K-OMS-2

Example 1

Hydrothermal Synthesis of K-OMS-2

Potassium sulfate, potassium persulfate, and manganese sulfate monohydrate in the molar ratio of 3:3:2 (totaling 32 mmol) were dissolved in 70 mL of DDW. The reaction mixture was then transferred into a 125 mL hydrothermal reactor vessel and kept in an oven at 240° C. for 4 days. Finally, the dark brown slurry was filtered and washed with DDW until the filtrate was neutral. The solid catalyst was dried at 120° C. overnight before use.

Hydrothermal Synthesis of Cobalt Doped K-OMS-2

Potassium sulfate, potassium persulfate, and manganese sulfate monohydrate in the molar ratio of 3:3:2 (totaling 32 mmol) were dissolved in 70 mL of DDW. Then 2 mmol of cobalt nitrate was added to the reaction mixture. The reaction mixture was then transferred into a 125 mL hydrothermal reactor vessel and kept in an oven at 240° C. for 4 days. Finally the dark brown slurry was filtered and washed with DDW until the filtrate is neutral. The solid catalyst was dried at 120° C. overnight before use.

Characterization of the Catalysts

The synthesized catalysts were characterized with powder X-ray diffraction, nitrogen sorption methods, FESEM, TEM/HRTEM, TGA, and FT-IR. The process for heterogeneous and catalyst stability test was done by analyzing the catalyst treated under reaction conditions by XRD.

Example 2

Catalysts Activity Testing

The catalytic activity testing was performed in a ½" open ended quartz tubular fixed bed flow reactor at atmospheric pressure. The activity of the catalyst was tested at different reaction temperatures. First, the catalyst mixture was prepared by mixing 80 mg of catalyst, 40 mg of soot, and 400 mg of SiC powder. The catalyst/soot weight ratio was 2:1. Prior to testing the catalyst, soot and SiC were mixed in a motor with a spatula in order to provide the loose contact between the catalyst and soot. All the gases used in this study were of ultra high purity (UHP) and were purchased from Airgas East Inc. (Salem, N.H.). The catalysts were pretreated in flowing He (20 mL/min) at 100° C. for 1 hour to completely dry and remove any adsorbed species on the surface. Application relevant tests were performed simulating the typical diesel soot engine exhaust conditions. A gas mixture including 10% $O_2$, 500 ppm (0.05%) $NO_2$, balanced by argon was passed through the fixed bed reactor, at a flow rate of 15,000 L/kg cat-hour. As such, while the temperature was increased according to a temperature programmed oxidation procedures, the amount of $CO_2$, and CO discharged from the outlet was by a SRI 8610 C gas chromatograph (GC) equipped with a 6' molecular sieve, a 6' silica gel column, and a thermal conductivity detector (TCD).

Example 3

Catalytic Results

The catalysts were tested for their activity in soot oxidation under real diesel engine exhaust gas compositions (10% oxygen+500 ppm $NO_2$). The contact between the catalysts and soot was considered as a loose contact. The activity of the catalyst at different temperatures and their kinetics, the selectivity of the final product towards carbon dioxide, and the catalyst stability under diesel soot exhaust conditions were studied.

Example 4

Soot Conversion Percentage Evaluation

FIG. 1 graphically shows the effect of temperature on the soot oxidation activity for noncatalytic (NON), Co-doped cryptomelane (Co-OMS-2), hydrothermaly synthesized undoped cryptomelane (HY-OMS-2), and commercially available manganese oxide (COM).

The activity upon soot conversion percentage was tested with non catalytic soot oxidation, commercial manganese oxide, undoped cryptomelane, and cobalt doped cryptomelane catalysed soot oxidation. Cobalt doped cryptomelane showed a significant catalytic activity compared to the other catalyzed and non catalyzed reactions. The soot conversion started between 150-200° C. and the oxidation rate increased drastically between 250-300° C. The 100% soot conversion was achieved at 349° C., which is very low compared to the reported values. The reaction was continued till 450° C. Between 349-450° C. the catalysts continued showing its maximum activity and 100% soot conversion was achieved.

FIG. 2 shows the temperatures at which 10% (T10), 50% (T50), 90% (T90), and 100% (T100) were achieved with non catalytic soot oxidation and the reactions catalyzed by different catalysts. Cobalt doped crytomalane achieved 100% conversion at a temperature which is 275° C. lower than the temperature at 100% conversion with no catalyst. The commercial manganese oxide, on the other hand did not achieve 100% conversion even at 475° C. Compared to commercial manganese oxide, cobalt doped cryptomelane achieved 90% conversion at a temperature which is 132° C. lower than that for the commercial material.

FIG. 2 shows the oxidation temperature of soot with noncatalytic (NON), Co-doped cryptomelane (Co-OMS-2), hydrothermaly synthesized undoped cryptomelane (HY-OMS-2), and commercially available manganese oxide (COM).

Figure 3:
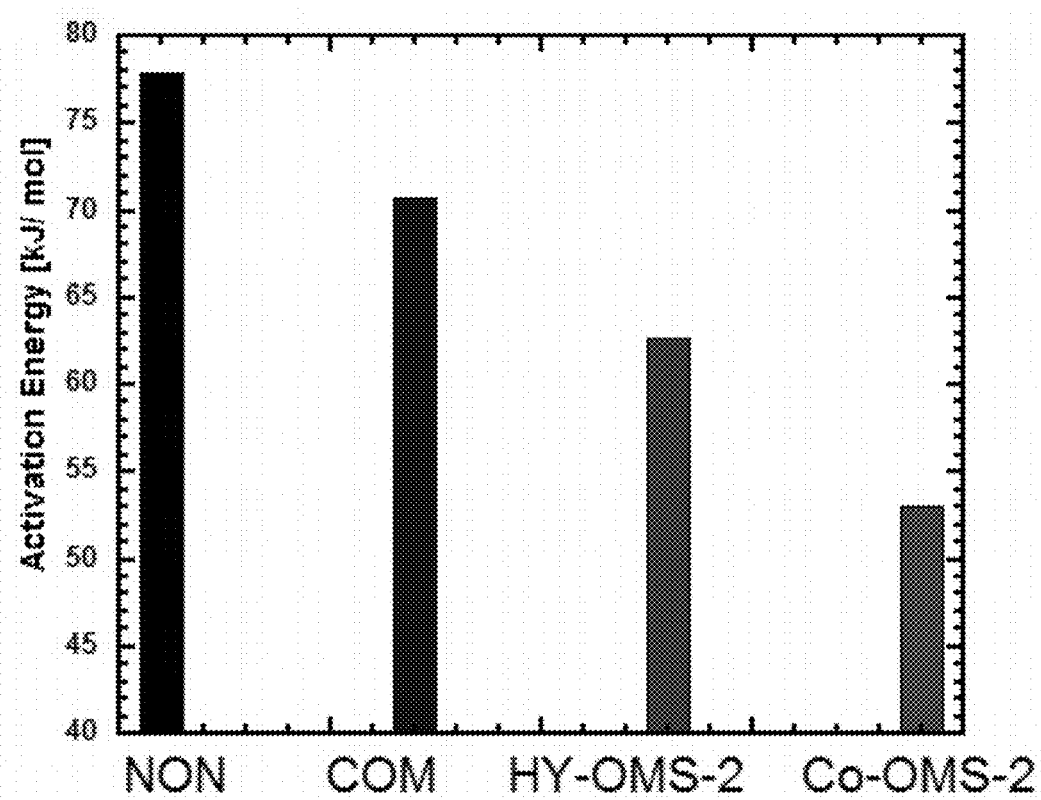
FIG. 3 graphically shows activation energies for non-catalyzed (NON), and catalyzed [Co-doped cryptomelane (Co-OMS-2), hydrothermaly synthesized undoped cryptomelane (HY-OMS-2), and commercially available manganese oxide (COM)] soot oxidation reactions in accordance with Example 4.

FIG. 3 graphically shows activation energies for non-catalyzed (NON), and catalyzed [Co-doped cryptomelane (Co-OMS-2), hydrothermaly synthesized undoped cryptomelane (HY-OMS-2), and commercially available manganese oxide (COM)] soot oxidation reactions. FIG. 3 graphically shows the activation energy comparison between non catalyzed reaction and catalyzed reactions. Cobalt doped cryptomelane shows the lowest activation energy which is 24.9 kJ/mol lower than that of non-catalyzed reaction.

Figure 4:
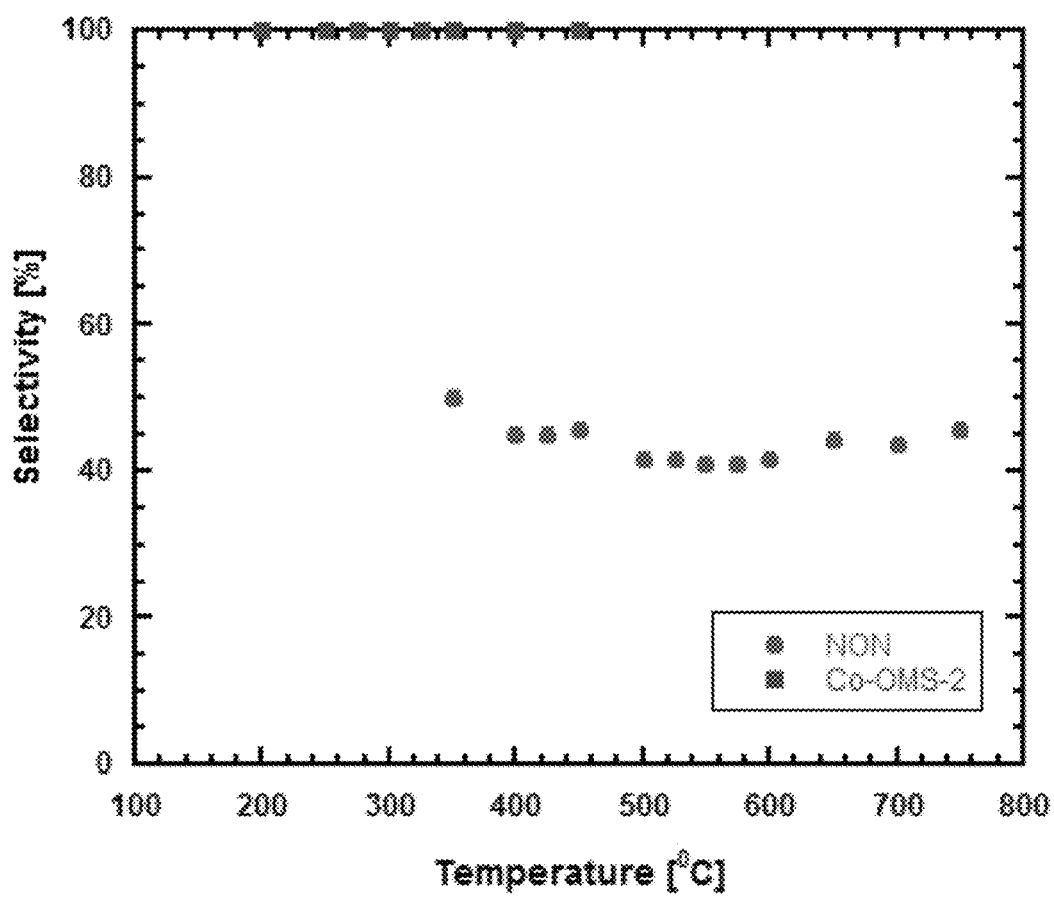
FIG. 4 graphically shows selectivity towards carbon dioxide as a function of temperature for non-catalyzed (NON) and Co-doped cryptomelane catalyzed (Co-OMS-2) reactions in accordance with Example 4.

FIG. 4 graphically shows selectivity towards carbon dioxide as a function of temperature for non-catalyzed (NON) and Co-doped cryptomelane catalyzed (Co-OMS-2) reactions. FIG. 4 graphically shows the selectivity towards carbon dioxide. Co doped OMS-2 produces 100% carbon dioxide during the oxidation of soot which can be considered as a huge improvement. The selectivity remained at 100% throughout the experiment. No signal in the gas chromatograph was observed for carbon monoxide. On the other hand, non catalyzed soot oxidation achieved a maximum selectivity of 50% towards carbon dioxide at 350° C. The selectivity then fluctuated in between 35-45%.

Figure 5:
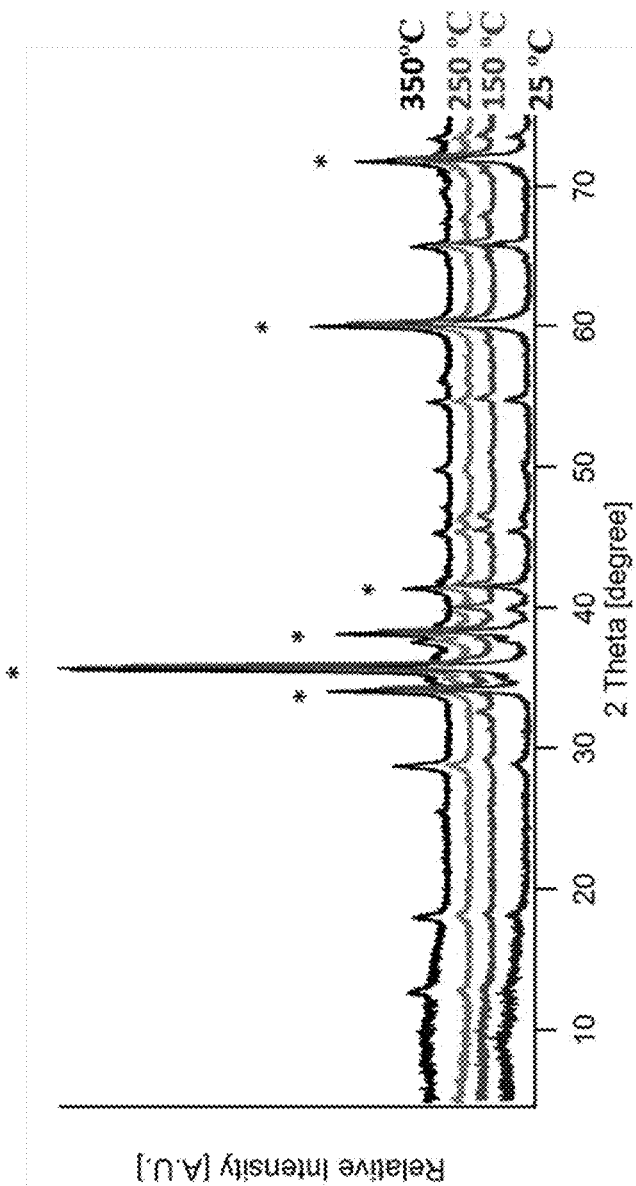
FIG. 5 shows XRD patterns for the reaction mixture consists of Co-doped cryptomelane (Co-OMS-2), soot, and silicon carbide, at different reaction temperatures in accordance with Example 4.

FIG. 5 shows XRD patterns for the reaction mixture consists of Co-doped cryptomelane (Co-OMS-2), soot, and silicon carbide, at different reaction temperatures. The catalyst stability was tested by analyzing the XRD at different temperatures under reaction conditions (FIG. 5). In the XRD patterns peaks for both the catalyst and SiC were observed. The peaks for catalyst were obtained at different reaction temperatures, (25-350° C.) under reaction operating conditions. The peak positions of the obtained XRD patters remained the same, indicating the crystal structure stability of the catalyst under reaction conditions. Hence, the catalyst prepared in the present disclosure can be successfully regenerated and recycled.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims. Also, the subject matter of the appended dependent claims is within the full intended scope of all appended independent claims.

What is claimed is:

1. A method for oxidizing soot from diesel exhaust gas from a diesel engine, said method comprising:
   providing a diesel particulate filter for receiving the diesel exhaust gas;
   coating a catalyst composition on the diesel particulate filter, wherein the catalyst composition comprises a cobalt doped manganese oxide octahedral molecular sieve (OMS-2); and
   contacting the soot from the diesel exhaust gas with the catalyst coated diesel particulate filter at a temperature sufficient to oxidize the soot to carbon dioxide.

2. The method of claim 1, wherein the contacting is conducted at a temperature of about 350° C. or less.

3. The method of claim 1, wherein the contacting is conducted at a temperature of the diesel exhaust gas.

4. The method of claim 1, wherein the cobalt doped manganese oxide octahedral molecular sieve (OMS-2) has a Cryptomelane type structure.

5. The method of claim 1, wherein the catalyst composition to soot weight ratio is from about 1.5:1 to about 3:1.

6. The method of claim 1, wherein the oxidation of the soot produces no carbon monoxide, and the catalyst composition contains no noble metals or rare earth metals.

7. The method of claim 1, wherein the cobalt in the cobalt doped manganese oxide octahedral molecular sieve (OMS-2) is present in an amount of from about 0.1 weight percent to about 25 weight percent.

8. The method of claim 1, further comprising regenerating the cobalt doped manganese oxide octahedral molecular sieve (OMS-2) at a temperature and for a period to time sufficient to substantially oxidize the soot to carbon dioxide.

9. A diesel exhaust gas treatment system comprising:
   a diesel particulate filter for receiving diesel exhaust gas from a diesel engine and collecting soot; and
   a catalyst composition coated on the diesel particulate filter; wherein the catalyst composition comprises a cobalt doped manganese oxide octahedral molecular sieve (OMS-2).

10. The system of claim 9, wherein the cobalt doped manganese oxide octahedral molecular sieve (OMS-2) has a Cryptomelane type structure.

11. The system of claim 9, wherein the catalyst composition to soot weight ratio is from about 1.5:1 to about 3:1.

12. The system of claim 9, wherein oxidation of the soot produces no carbon monoxide, and the catalyst composition contains no noble metals or rare earth metals.

13. The system of claim 9, wherein the cobalt in the cobalt doped manganese oxide octahedral molecular sieve (OMS-2) is present in an amount of from about 0.1 weight percent to about 25 weight percent.

14. The system of claim 9, wherein the cobalt doped manganese oxide octahedral molecular sieve (OMS-2) is regenerated at a temperature and for a period of time sufficient to substantially oxidize the soot to carbon dioxide.

15. A method of providing a catalyst composition on a diesel particulate filter, said method comprising: providing a diesel particulate filter; and applying a catalyst composition for facilitating soot oxidation on the diesel particulate filter; wherein the catalyst comprises a cobalt doped manganese oxide octahedral molecular sieve (OMS-2).

16. The method of claim 15, wherein the cobalt doped manganese oxide octahedral molecular sieve (OMS-2) has a Cryptomelane type structure.

17. The method of claim 15, wherein the catalyst composition to soot weight ratio is from about 1.5:1 to about 3:1.

18. The method of claim 15, wherein the oxidation of the soot produces no carbon monoxide, and the catalyst composition contains no noble metals or rare earth metals.

19. The method of claim 15, wherein the cobalt in the cobalt doped manganese oxide octahedral molecular sieve (OMS-2) is present in an amount of from about 0.1 weight percent to about 25 weight percent.

20. The method of claim 15, further comprising regenerating the cobalt doped manganese oxide octahedral molecular sieve (OMS-2) at a temperature and for a period of time sufficient to substantially oxidize the soot to carbon dioxide.

21. A catalyst composition for facilitating soot oxidation to CO2, said catalyst composition comprising a diesel particulate filter including a cobalt doped manganese oxide octahedral molecular sieve (OMS-2).

22. The catalyst composition of claim 21, wherein the cobalt doped manganese oxide octahedral molecular sieve (OMS-2) has a Cryptomelane type structure.

23. The catalyst composition of claim 21, wherein the catalyst composition to soot weight ratio is from about 1.5:1 to about 3:1.

24. The catalyst composition of claim 21, wherein oxidation of the soot produces no carbon monoxide, and the catalyst composition contains no noble metals or rare earth metals.

25. The catalyst composition of claim 21, wherein the cobalt in the cobalt doped manganese oxide octahedral molecular sieve (OMS-2) is present in an amount of from about 0.1 weight percent to about 25 weight percent.

26. The catalyst composition of claim 21, wherein the cobalt doped manganese oxide octahedral molecular sieve (OMS-2) is regenerated at a temperature and for a period to time sufficient to substantially oxidize the soot to carbon dioxide.

* * * * *